Figure 1:
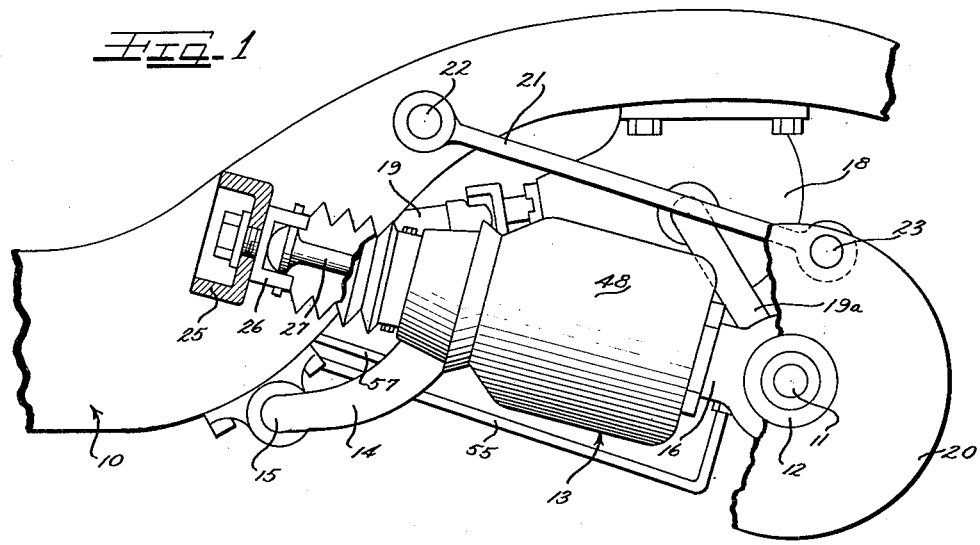

Aug. 29, 1961  J. P. HEISS  2,998,240
VEHICLE SUSPENSION
Filed Dec. 28, 1956  2 Sheets-Sheet 1

Inventor
JOHN P. HEISS
By Hill, Sherman, Meroni, Gross & Simpson
Attys

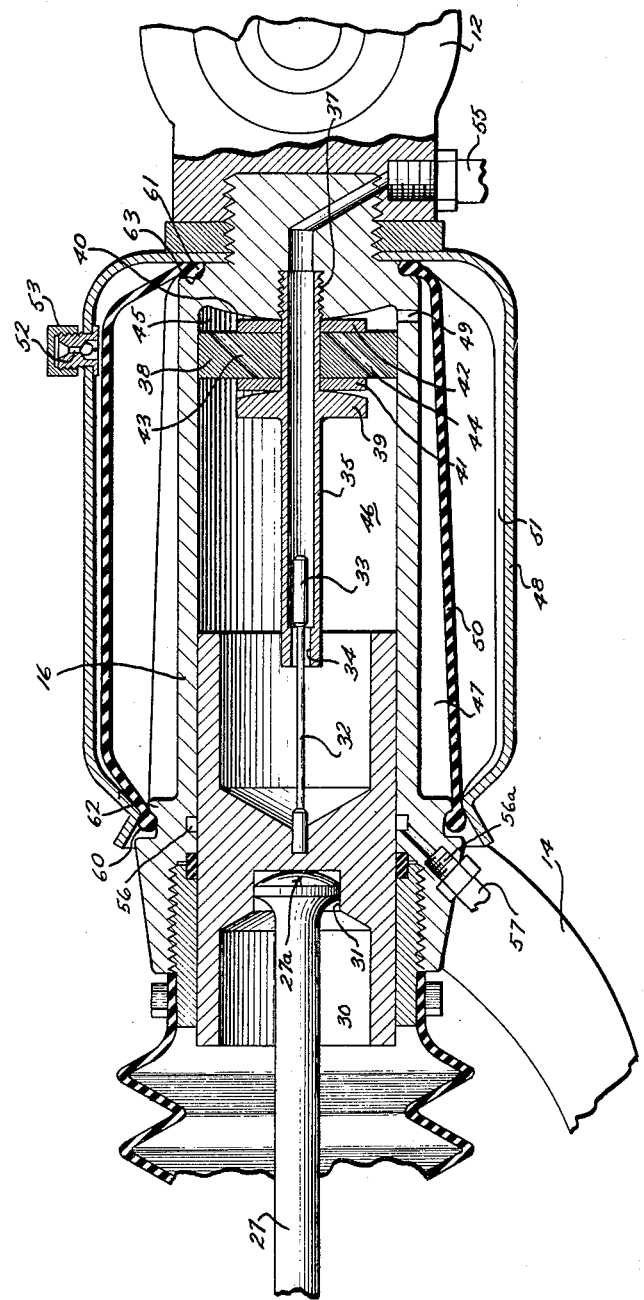

United States Patent Office 2,998,240
Patented Aug. 29, 1961

1

2,998,240
VEHICLE SUSPENSION
John P. Heiss, Flint, Mich., assignor to Thompson Ramo Wooldridge Inc., a corporation of Ohio
Filed Dec. 28, 1956, Ser. No. 631,319
9 Claims. (Cl. 267—15)

The present invention relates to vehicular suspension systems and is, more particularly, concerned with the provision of a greatly improved and simplified vehicle suspension system employing hydro-pneumatic springs.

As those familiar with the art of vehicle suspension are aware, a large number of pneumatic suspension systems have been developed and, in some cases, these prior art systems have been commercially employed on the larger vehicles such as buses, trucks and the like. Such vehicles, however, are ordinarily constructed as commercial vehicles and the initial cost of the system is effectively balanced against maintenance costs so that the relatively high cost of many of the prior art pneumatic spring systems has not been considered a paramount deterrent. However, for the usual passenger car, the initial cost ordinarily is considered a most important factor and accordingly a commercially satisfactory pneumatic system for passenger car use must be not only satisfactory from a maintenance point of view but must also have a truly competitive initial cost.

In order to provide a simple suspension system from the cost point of view it is necessary that the suspension components be made as compact as possible and that the assembly operations of the system, and especially the assembly of the system into the vehicle frame and body assembly, be simplified. In accordance with the principles of the present invention the individual wheel supports for the vehicle are integrated with individual hydro-pneumatic springs in a manner such that the entire spring apparatus except the source of hydraulic fluid under pressure for energizing the springs is carried by the wheel support. As a result, all of the spring members may be simplified, the conduits ordinarily leading from a leveling control valve to the spring may be eliminated as separate elements of the system, and the leveling valves may be simplified and positioned immediately adjacent the spring so that friction losses ordinarily inherent in the conduit systems are minimized and the valve action is improved. In accordance with the principles of the present invention, the entire spring and wheel support assembly is integrated into a single compact unit for each wheel and the framework for the leveling or suspension mechanism serves a dual function of providing the suspension system housing and also providing the main vehicle supporting arm associated with its respective wheel.

In a preferred embodiment of the present invention for accomplishing the above set forth improvements, a supporting arm for a vehicle wheel is pivotally secured to the vehicle frame at one end and carries the actual wheel supporting spindle at the other end. The support is formed in a somewhat L-shape and is arranged with the spring force acting through the long leg of the L against a reaction point on the vehicle frame tending to move the long leg of the L outwardly away from the frame about the pivot of the support which is found at the end of the short leg of the L. The long leg of the L is formed in a cylinder and a piston is slidable within the cylinder for movement relative thereto by cooperation with the point of reaction on the vehicle frame when the support is oscillated about its pivot on the frame. A spring chamber of the pneumatic type is constructed concentrically around the outer surface of the support cylinder and is ported directly to the inner surface of the cylinder for cooperation with the piston reciprocal therein. Valving is incorporated in the piston and cylinder for controlling movement of hydraulic fluid from the cylinder into the pneumatic spring chamber and hydraulic fluid under pressure is directed into the cylinder via a flexible conduit extending to the vehicle frame and to a central source of hydraulic fluid under pressure. As a result of this general arrangement of parts an extremely simple suspension unit is provided which is adaptable to either front or rear suspension elements in a passenger vehicle and which is simply assembled into the vehicle without the necessity of attachment of springs to the vehicle frame at various points thereon. Further, the use of conduits from the valving to the spring, a source of constant difficulties in prior systems, is substantially eliminated and the control of the suspension unit accordingly is improved.

It is, accordingly, an object of the present invention to provide a compact vehicle suspension unit adaptable for use either as a front or rear wheel suspension unit.

Another object of the present invention is to provide an integrated vehicle wheel spring and control arm support unit.

Still a further object of the present invention is to provide a vehicle hydro-pneumatic spring suspension arrangement wherein separate conduits leading from the leveling control valve thereof to the individual wheel pneumatic springs are eliminated.

Yet a further object of the present invention is to provide a simplified combined hydro-pneumatic spring system and leveling valve unit wherein the leveling valve and the spring are carried by the vehicle support arm suspended from the vehicle frame.

Yet a further object of the present invention is to provide a hydro-pneumatic spring suspension system wherein the vehicle leveling valve and the force applied to the vehicle wheel support member are applied directly to the vehicle support member and are contained therein in a simple manner.

A feature of the invention resides in the utilization of a vehicle wheel support member constructed in a general form of an L arranged for pivotal association with a frame at the end of one leg thereof and for association with wheel support at the end of the other leg thereof and for the application of suspension forces at the point of joinder of the legs thereof.

Another feature of the invention resides in the provision of a wheel supporting arm formed in the shape of an L in which one leg thereof comprises a hollow cylinder having an axis longitudinal of the leg and arranged with a hydraulic piston reciprocably mounted therein for the application of forces to the vehicle frame and support arm in a direction axial of said leg.

Still a further feature of the invention is the provision of a pneumatic spring for an individual wheel and which is mounted concentrically with the support arm for that wheel.

Figure 2:
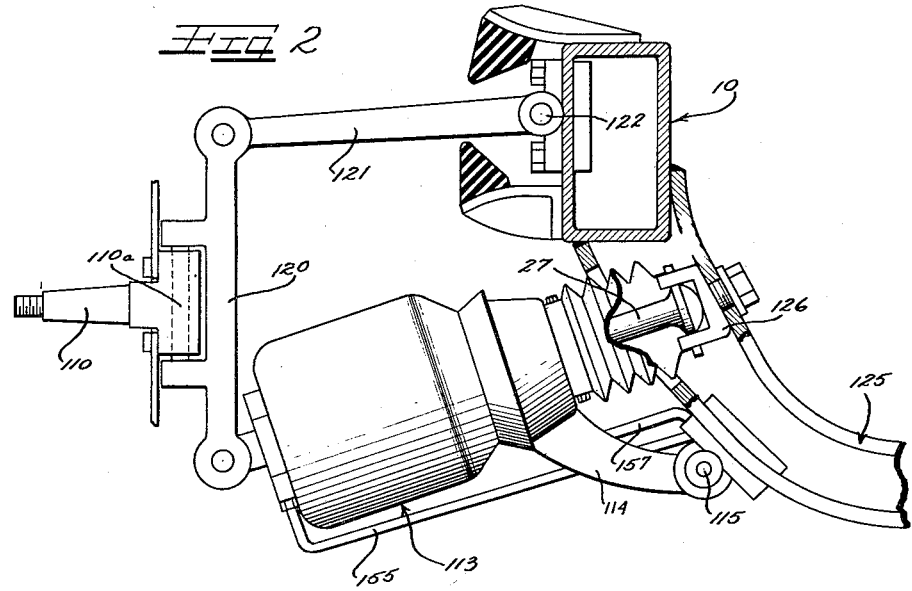

Still other and further objects and features of the present invention will at once become apparent to those skilled in the art from a consideration of the attached drawings wherein two embodiments of the present invention are shown by way of illustration only; and wherein FIGURE 1 is a side elevational view, partially broken away, of a suspension system incorporating the principles of the present invention;

FIGURE 2 is a fragmental end elevation, partially broken away, of a suspension unit of the present invention incorporated into the front wheels of a vehicle; and FIGURE 3 is an enlarged cross-sectional view of the combined spring and control valve unit illustrated in FIGURES 1 and 2 and showing the internal construction and operation thereof.

As shown on the drawings:

As may be seen from a consideration of FIGURES 1 and 2, a vehicle frame of generally conventional construction is illustrated at 10. In the portion of the frame shown in FIGURE 1, namely the rear portion, a rear axle 11 is rotatably supported in an axle housing 12 which is in turn rigidly secured to a supporting arm generally indicated at 13. The supporting arm 13 is provided with a downwardly extending short arm 14 which is pivotally secured to the frame 10 at 15. As a result of this arrangement, the axle 11 is supported in the housing 12 for oscillation about the pivot point 15 relative to the frame 10.

A power drive for the rear axle 11 may be directed to the axle by any conventional means but in the embodiment illustrated the drive is applied to a differential 18 by means of a propeller shaft 19 and is directed to the axle 11 from the differential 18 by means of an axle shaft 19a having universal joints at the opposite ends thereof thereby providing for the independent suspension of the individual rear wheels.

A wheel brake backing plate 20 is rotatably mounted relative to the axle housing 12 but is maintained in a generally constant non-rotatable relation relative thereto by means of a radius rod 21 pivotally secured to the frame at 22 and likewise pivotally secured to the brake backing plate 23. With the supporting arms in the relationship illustrated it will be apparent that braking torque applied to the brake backing plate when the car is being braked in the forward direction will be applied to the brake backing plate in a counter-clockwise direction and will operate tending to move the housing 12 and backing plate downwardly relative to the frame. The resultant movement of the housing 12 will, of course, depend upon the actual geometry of the trailing link suspension comprising the supporting arm 13 and the radius rod 21 in combination with the brake backing plate, and as is well known in the industry the length and position of the supporting arm 13 and the link 21 may be varied to provide for the opposite, or upward, movement if so desired. The exact geometry shown in FIGURE 1 is not considered important to the inventive concepts of the present invention and instead is shown only as an illustrative example of a trailing link suspension to which the leveling suspension of the present invention is readily adaptable.

As may be seen in FIGURE 1, the frame 10 is provided with a cross member 25 rigidly secured thereto. A reaction bracket 26 is attached to the cross member 25 at a point generally coaxial with the leg 16 of the support arm 13 such that a connecting rod or push rod 27 may be positioned to exert a force reaction between the leg 16 and the frame 10. It will be obvious that if an expansible element were placed between the push rod 27 and the leg 16 of the support arm 13, expansion of that element would cause clockwise pivotal movement of the support arm 13 about the pivot point 15. Likewise, if the expansible member were to contract the weight of the vehicle would cause the support arm 13 to move counter-clockwise about the pivot 15. In accordance with the present invention an expansible structure is provided between the push rod 27 and the leg 16 or axle housing 12. This expansion member is constructed to automatically raise or lower the support arm 13 in response to the relative positions of the vehicle frame 10 and the axle 11 and it is constructed as more fully disclosed in FIGURE 3.

As shown in FIGURE 3, the axle housing 12 is rigidly secured to a longitudinally extending cylinder 16 having rigidly welded or integral therewith a downwardly extending arm 14, above described. As shown, the legs 14 and 16 form the short and long legs, respectively, of an L-shaped supporting arm. The cylinder 16 has, reciprocably mounted therein, a piston 30. The piston 30 has a socket 31 for universal pivotal association with the end 27a of the push rod 27. At the opposite end of the piston 30 a valve stem 32 is provided having an enlarged head portion 33 at its outward end. The head 33 has a diameter slightly less than the inside diameter of an orifice 34 in a valve inlet duct or tube 35 so that upon expansion of the piston 30 away from the housing 12 from the position shown in FIGURE 3, the valve head 33 is permitted to pass through, or partially through, the valve orifice 34. The tube 35 is rigidly secured to the right hand end of cylinder 16, as at 37 and is provided with a dash pot bulkhead 38 rigidly secured in position between abutment 39 on the tube and end wall 40 of the cylinder 16. A pair of spring flap valves 41 and 42 are positioned between the bulkhead 38 and the abutments 39 and 40 respectively. As may be seen, a plurality of generally radial ports 43 and 44 are provided in the bulkhead 38 such that restricted movement of hydraulic fluid through the ports 44, against the spring valve 42, is permitted when the piston 30 moves toward the right, and restricted flow through the ports 43 against the spring 41 is permitted when the piston 30 moves toward the left and fluid moves from chamber 45 into chamber 46. Hydraulic fluid in chamber 45 is in direct communication with hydraulic fluid within the hydraulic chamber 47 of a concentric hydro-pneumatic spring chamber 48 via port 49. The spring 48 comprises a rubber accordion pleated bellows 50 which separates the hydraulic fluid in chamber 47 from gas chamber 51 under high pressure. Gas may be introduced into the chamber 51 by means of a conventional pneumatic valve 52 having a cap 53 which prevents inadvertent release of air or gas under pressure from the chamber 51.

Hydraulic fluid under pressure is introduced into the main chamber 46 in the support arm cylinder 16 by way of the tube 35 from a flexible conduit 55 which in turn may be supplied by a pump or other source of hydraulic fluid under pressure. This fluid under pressure flows through the orifice 34 under the control of the valve head 33 and causes movement of the piston 30 toward the left as viewed in FIGURE 3 until such time as the valve head 33 moves almost into the orifice 34, at which time only a small amount of fluid is permitted to bleed through the orifice 34. A loose fit is provided between the piston 30 and the internal wall of the cylinder 16 so that a continuous small leakage is permitted from the chamber 46 out through the outlet port 56, a restricted fitting 56a, and low pressure outlet conduit 57 which leads to a reservoir. As a result of the leakage permitted past the piston 30 and the disparity between the diameters of the head 33 and the orifice 34, a constant leak-down is provided in the system in the manner generally described in my co-pending United States application Serial No. 534,121, now Patent No. 2,957,702.

In operation, with a source of fluid under pressure available, fluid is introduced into the chamber 46 via the orifice 34 until the piston 30 is moved into a position corresponding to the position in which the valve head 33 is just entering the orifice 34 and the leak-down past the piston 30 is balanced by the leakage flow past the valve head 33. With the piston 30 in this position, the push rod 27 will be in a position maintaining the supporting arm 13 in its design or proper level position generally illustrated in FIGURE 1. When an impact or oscillation is applied to the system, as when the vehicle goes over a bump in the road, the arm 13 pivots in a counter-clockwise direction around the pivot 15 and the push rod 27 forces the piston 30 toward the right as viewed in FIGURE 3 forcing fluid from the chamber 46 through the restricted apertures 44, into the chamber 45 and from thence into the chamber 47 of the pneumatic spring, against the resilience of the air or gas confined in chamber 51. The build-up, or increased, pressure in the chamber 51 forces the fluid in chamber 47 back into the chamber 46 via the return restricted orifices 43. The restriction in the orifices 43 and 44 provides a damping action ordinarily sufficient to satisfy the usual shock absorber function. The valve springs 41 and 42 operate as blow-off valves for sharp impacts in the manner well known in the shock absorber art. It will be obvious that the diameter of the restricted ports 43 and 44 may be varied depending upon the damping action required, as may be the thickness, and hence resiliency, of flap valves 41 and 42.

If an additional weight is added to the frame 10 of the vehicle, with the parts in the level condition as above described, there will be a tendency for the support arm 13 to move in a counter-clockwise direction with a resultant movement of the piston 30 toward the right by the push rod 27. This will open the orifice 34 to additional fluid under pressure via the tube 35 and, as a result, additional fluid under pressure will flow into chamber 46 to again level the vehicle to its above described design condition.

From a consideration of the combined leveling and spring unit above described, it will be apparent that the leveling valve is integrated directly into the suspension unit in a simple and yet effective manner. Likewise, the ony conduit from the valves to the air spring is the short port 49 which need offer only an absolute minimum of resistance to fluid flow. Further, it is obvious that no leaky connections can possibly occur in the hydro-pneumatic spring since no flexible conduits or other type of screw fittings are employed between the hydro-pneumatic spring and the pressure chamber 46. The only possible point of high-pressure fluid escape would be at the connection 55 in the high-pressure line which is, of course, an absolute minimum in any central pressure source system. Further, it will be noted that by placing the pneumatic spring concentrically of the cylinder 16, the pneumatic spring is simplified and a minimum of bulk is necessary.

It will be noted in connection with the bellows 50 forming the intermediate part of the hydraulic-pneumatic spring, that the bellows 50 is maintained and positioned by means of an enlarged bead 60 at one end and 61 at the other end. These respective beads are caught behind the respective shoulders 62 and 63 formed on the cylinder 16 and are held behind the shoulders by means of the outer sheet metal shell 48 forming the pneumatic chamber 51.

It will be further noted that since the entire weight of the vehicle is applied to the push rod 27 it is unnecessary to provide a positive connection between the ends of the push rod and the bracket 26 or the piston 30. The resilient pressure acting on the piston 30 will ordinarily maintain the push rod 27 in its position shown under any and all load circumstances. It will be understood, however, that a positive universal joint may be substituted, if desired for the simplified structure illustrated so that there can be no possibility whatever of disassociation on the push rod 27 from the socket 31 or the bracket 26.

In the embodiment of the wheel support arm illustrated in FIGURE 2, the device is adapted to the front suspension of a vehicle. The suspension can either be of the king pin or ball joint type. As shown, the wheel supporting spindle 110 is mounted for oscillation around a vertical pivot axis 110a defined by the steering knuckle 120. The steering knuckle 120 is constrained to move in a path defined by an upper control arm 121 and a lower support arm 113 which are pivotally secured to the frame 10 at 122 and 115 respectively. As will be noted, the lower support arm 113 is substantially identical to the support arm 13 employed with the trailing link rear end suspension having a depending short arm 114 pivoted at 115. This arm 115 as well as the arm 14 of the suspension of FIGURE 1, can have a forked end for the pivot connection 15 or 115. The push rod of arm 13 cooperates with a bracket 126 rigidly secured to the frame front cross member 125 in the same manner discussed above relative to the connection between the push rod 27 and the bracket 26. Likewise, the hydraulic fluid is supplied to the system in an identical manner via the flexible conduits 157 and 155.

As in the case of the system described relative to the trailing link rear suspension, the front suspension shown in FIGURE 2 maintains the front of the vehicle at a predetermined design level condition by expansion and contraction of the support arm 113 under the influence of added loads to the vehicle.

From the point of view of structural rigidity and safety, it is considered desirable that the supporting arm 113 and 13 be constructed to house the hydro-pneumatic spring and valving arrangements in the manner shown. However, it will be clear that the function of the supporting arms 113 and 13 is to maintain an angular relationship of the suspension system to the frame and, accordingly, the spring and valving might be applied to the radius rods 21 or 121 if desired.

It will be understood, however, that the arrangement shown is the preferred arrangement.

It will be obvious to those skilled in the art that variations in the present construction may be made without departing from the scope of the concepts of the present invention. Accordingly, it is my intention that the scope of the present invention be limited solely by that of the hereinafter appended claims.

I claim as my invention:

1. In combination in a vehicle suspension, a wheel supporting axle member, a frame member, a support arm pivotally secured to said frame member at one end and carrying said axle at the other end for movement relative to the frame in a generally vertical direction, and reciprocal fluid spring means bodily mounted on said support arm and acting generally longitudinally thereof against said frame at a point on said frame above the pivotal connection of said frame with said arm for applying a resilient force tending to move said axle downwardly relative to said frame, said last named means including means controlling the resilient force to a value just sufficient to maintain the axle at a predetermined position relative to said frame independently of the load on said frame and means constantly sensing the relative positions of said frame member and axle member and automatically modifying said controlling means in response to variations in said relative positions.

2. In combination in a vehicle suspension, a wheel supporting axle member, a frame member, a support arm pivotally secured to said frame member at one end and carrying said axle at the other end for movement relative to the frame in a generally vertical direction, and reciprocal fluid spring means bodily mounted on said support arm and acting generally longitudinally thereof against said frame at a point on said frame above the pivotal connection of said frame with said arm for applying a resilient force tending to move said axle downwardly relative to said frame, said last named means including means controlling the resilient force to a value just sufficient to maintain the axle at a predetermined normal position relative to said frame independently of the load on said frame and incorporating a valve carried by said arm and having the operative parts thereof moved relative to each other in controlling relation upon pivotal movement of said arm, and fluid pressure means controlled by said valve to modify the said resilient force.

3. In combination in a vehicle suspension, a wheel supporting axle member, a frame member, a support arm pivotally secured to said frame member at one end and carrying said axle at the other end for movement relative to the frame in a generally vertical direction, and reciprocal fluid spring means bodily mounted on said support arm and acting generally longitudinally thereof against said frame at a point on said frame above the pivotal connection of said frame with said arm for applying substantially the entire resilient force tending to move said axle downwardly relative to said frame to support the frame therabove, said axle member comprising the rotatable axle of a vehicle rear wheel and said arm being pivotal in a plane substantially parallel to the longitudinal axis of said frame.

4. In combination in a vehicle suspension, a wheel supporting axle member, a frame member, a support arm pivotally secured to said frame member at one end and carrying said axle at the other end for movement thereof relative to the frame in a generally vertical direction, said arm having an L configuration with said pivot adjacent the extremity of one of the legs of the L and the axle adjacent the extremity of the other leg of said L, said other leg having a cylinder rigid therewith, a piston in said cylinder, ball and socket means operatively connecting said piston to said frame along a line of force generally longitudinally of said other leg, a pneumatic spring, means introducing hydraulic fluid under positive pressure in to said cylinder on the opposite side of said piston from said frame, and means interconnecting said last-named means and said pneumatic spring for maintaining the pressure in said spring on said fluid for resiliently urging said piston against said frame and said other leg away from said frame.

5. In combination in a vehicle suspension, a wheel supporting axle member, a frame member, a support arm pivotally secured to said frame member at one end and carrying said axle at the other end for movement thereof relative to the frame in a generally vertical direction, said arm having an L configuration with said pivot adjacent the extremity of one of the legs of said L, the other leg having a cylinder rigid therewith, a piston in said cylinder, means operatively connecting said piston to said frame along a line of force generally longitudinally of said other leg, a pneumatic spring, means introducing hydraulic fluid into said cylinder on the opposite side of said piston from said frame, and means interconnecting said last-named means and said pneumatic spring for maintaining the pressure in said spring on said fluid for resiliently urging said piston against said frame and said other leg away from said frame, including a valve member secured to said piston and a cooperating valve member in said cylinder secured to said other leg whereby relative movement of said other leg and said piston causes actuation of said valve to vary the fluid pressure in said cylinder against said piston.

6. In combination in a vehicle suspension, a wheel supporting axle member, a frame member, a support arm pivotally secured to said frame member at one end and carrying said axle at the other end for movement thereof relative to the frame in a generally vertical direction, said arm having an L configuration with said pivot adjacent the extremity of one of the legs of said L, the other leg having a cylinder rigid therewith, a piston in said cylinder, means operatively connecting said piston to said frame along a line of force generally longitudinally of said other leg, a pneumatic spring, means introducing hydraulic fluid into said cylinder on the opposite side of said piston from said frame, and means interconnecting said last-named means and said pneumatic spring for maintaining the pressure in said spring on said fluid for resiliently urging said piston against said frame and said other leg away from said frame, including a valve member secured to said piston and a cooperating valve member in said cylinder secured to said other leg whereby relative movement of said other leg and said piston causes actuation of said valve to vary the fluid pressure in said cylinder against said piston, and said pneumatic spring comprising a generally cylindrical casing concentric with said other leg and having communication with said cylinder directly via a port through the wall of said cylinder and at a point within the axial confines of said pneumatic spring.

7. In combination in a vehicle suspension, a wheel supporting axle member, a frame member, a support arm pivotally secured to said frame member at one end and carrying said axle at the other end for movement thereof relative to the frame in a generally vertical direction, said arm having an L configuration with said pivot adjacent the extremity of one of the legs of said L, the other leg having a cylinder rigid therewith, a piston in said cylinder, means operatively connecting said piston to said frame along a line of force generally longitudinally of said other leg, a pneumatic spring, means introducing hydraulic fluid into said cylinder on the opposite side of said piston from said frame, and means interconnecting said last-named means and said pneumatic spring for maintaining the pressure in said spring on said fluid for resiliently urging said piston against said frame and said other leg away from said frame, including a valve member secured to said piston and a cooperating valve member in said cylinder secured to said other leg whereby relative movement of said other leg and said piston causes actuation of said valve to vary the fluid pressure in said cylinder against said piston, said valve member being constructed to provide a continuous minimum flow of fluid under pressure into said cylinder and means permitting continuous leak-down of fluid from said cylinder back to the source of hydraulic fluid.

8. In combination in a vehicle suspension, a wheel supporting axle member, a frame member, a support arm pivotally secured to said frame member at one end and carrying said axle at the other end for movement thereof relative to the frame in a generally vertical direction, said arm having an L configuration with said pivot adjacent the extremity of one of the legs of said L, the other leg having a cylinder rigid therewith, a piston in said cylinder, means operatively connecting said piston to said frame along a line of force generally longitudinally of said other leg, a pneumatic spring, means introducing hydraulic fluid into said cylinder on the opposite side of said piston from said frame, and means interconnecting said last-named means and said pneumatic spring for maintaining the pressure in said spring on said fluid for resiliently urging said piston against said frame and said other leg away from said frame, including a valve member secured to said piston and a cooperating valve member in said cylinder secured to said other leg whereby relative movement of said other leg and said piston causes actuation of said valve to vary the fluid pressure in said cylinder against said piston, said valve member being constructed to provide a continuous minimum flow of fluid under pressure into said cylinder and means permitting continuous leak-down of fluid from said cylinder back to the source of hydraulic fluid, said leak-down means comprising a loose fit between said piston and said cylinder permitting the passage of a controlled amount of hydraulic fluid past said cylinder to a sump at all times.

9. In combination in a vehicle suspension, a wheel supporting axle member, a frame member, a support arm pivotally secured to said frame member at one end and carrying said axle at the other end for movement relative to the frame in a generally vertical direction, and reciprocal fluid spring means bodily mounted on said support arm and acting generally longitudinally thereof against said frame at a point on said frame above the pivotal connection of said frame with said arm for applying a resilient force tending to move said axle downwardly relative to said frame, said last named means including means controlling the resilient force to a value just sufficient to maintain the axle at a predetermined position relative to said frame independently of the load on said frame, and means constantly sensing the relative positions of said frame member and axle member and automatically modifying said controlling means in response to variations in said relative positions, said axle member comprising a spindle of a vehicle front wheel and said arm being pivotal in a plane generally transverse to the longitudinal axis of the frame, said arm comprising a control arm of an independent front wheel suspension employing upper and lower substantially horizontal control arms pivotally secured at their outer ends to the spindle and at their inner ends to the frame.

References Cited in the file of this patent

UNITED STATES PATENTS

| | | |
|---|---|---|
| 1,464,680 | Lassen | Aug. 14, 1923 |
| 1,861,821 | Schaum | June 7, 1932 |
| 2,021,043 | Bedford et al. | Nov. 12, 1935 |
| 2,047,287 | Opolo | July 14, 1936 |
| 2,104,499 | Svoboda et al. | Jan. 4, 1938 |
| 2,165,332 | Best | July 11, 1939 |
| 2,169,335 | Best | Aug. 15, 1939 |
| 2,254,491 | Olley | Sept. 2, 1941 |
| 2,620,182 | Marston et al. | Dec. 2, 1952 |
| 2,755,099 | Smith | July 17, 1956 |
| 2,756,046 | Lucien | July 24, 1956 |

FOREIGN PATENTS

| | | |
|---|---|---|
| 1,076,192 | France | Apr. 21, 1954 |